Inventors.
Carl P. Green
Basil N. Burnelli

By Stevens, Lehrer & Stevens

Attorneys.

United States Patent Office 3,605,798
Patented Sept. 20, 1971

3,605,798
WATER LEVEL CONTROLS FOR STEAM
TABLES AND THE LIKE
Carl P. Green, 25 N. Racine Ave. 60607, and Basil
N. Burnetti, 2421 N. Washtenaw Ave. 60647, both of
Chicago, Ill.
Filed Apr. 2, 1970, Ser. No. 25,217
Int. Cl. G05d 9/12
U.S. Cl. 137—392        14 Claims

ABSTRACT OF THE DISCLOSURE

A unit accessory to steam tables and the like for automatically replenishing the supply of water in the trough of the steam table when the water level falls to a low limit, to shut off the water supply when the water level rises to a routine high level, and to shut off the power in case the water shut-off facility fails and the water rises to an extremely high level. The unit operates an emergency red signal lamp at the lowest and highest water levels and an amber signal lamp during normal operation. The unit employs a set of electrodes which depend to different levels in the water trough, and are responsive to water contact at their lower ends to form circuits employing the conductivity of the water and a solenoid-actuated valve to turn on the water.

---

Our invention relates to steam tables, and more particularly to the maintenance of water in the same. Steam tables are made with a trough in which the water is heated, the means for this purpose usually consisting of a gas burner located under the trough. After a suitable amount of water is supplied to the trough the burner is kept in constant operation to insure the heating of the water to the boiling point. Obviously, the amount of water in the trough lessens as it evaporates; and the water is replenished when it reaches a pre-set low level. However, if this is not done, and the trough runs dry, the continued operation of the burner—if the replenishment of water is neglected a number of times—eventually corrodes or burns out the bottom of the trough and requires an expensive replacement or repair thereof.

The above circumstance points to neglect as the probable reason for allowing the water in the steam table trough to boil away and leave the bottom of the trough dry. However, it is difficult to ascertain the water level in the trough because the latter is fully covered by the trays or other food-containing vessels which are deposited in the top of the trough. Therefore, the water content of the trough can only be ascertained by lifting out a vessel from time to time and looking into the trough. Attendants who serve from a steam table or handle the food vessels are not expected to take this precaution, and it is therefore not taken often enough to insure the safe operation of the steam table.

In view of the above conditions, it is one object of the present invention to provide means accessory to the steam table for automatically replenishing the water supply in the trough when the water level falls to a low point in the operation of the steam table.

A further object is to provide a water control unit which automatically shuts off the water supply to the trough when the water in the trough has risen to a prescribed high level.

Another object is to provide an emergency electrical control which automatically shuts off the power to a water feed unit in case the regular automatic shut-off fails, and the water rises to an unusually high level.

An additional object is to provide a ripple control between routine water levels in order to avoid irregularities in the water feed.

A final object is to provide an apparatus accessory to the steam table which insures the presence of water in the trough as long as the water supply is in order or available.

A better understanding of the invention may be gained by reference to the accompanying drawing, in which—

Figure 1:
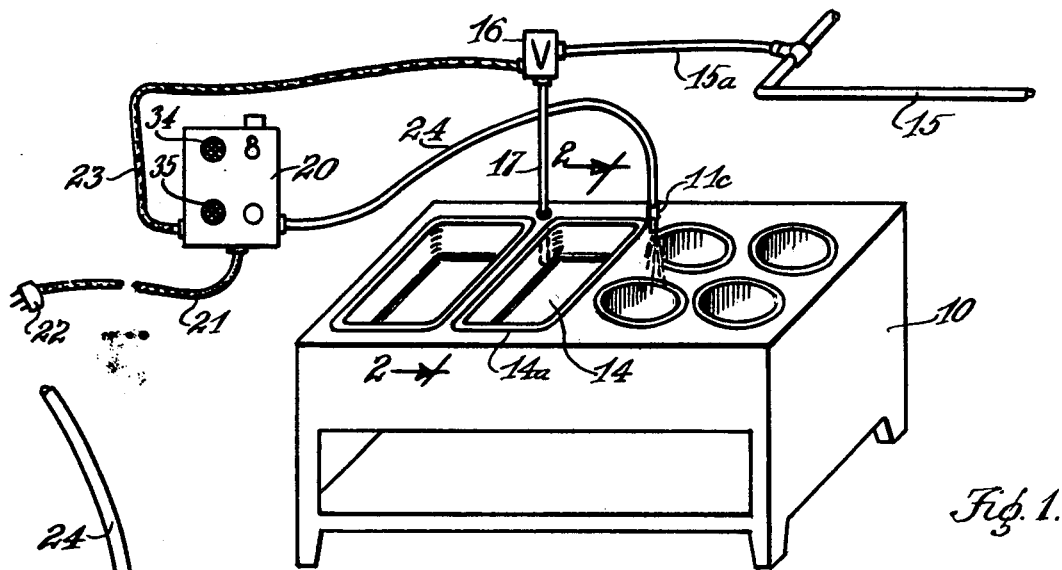
FIG. 1 is a perspective view showing the invention applied to a conventional steam table.

Referring specifically to the drawing, 10 denotes a typical steam table, 11 the trough inside the same, and 12 a burner for heating a quantity of water 13 contained in the same. The trough has a top 11a formed with a large opening for the deposit of a food container or vessel 14, the same having a marginal flange 14a resting on the top 11a.

FIG. 1 shows that a pipe or main 15 is the water supply source for the steam table. A branch 15a from the pipe 15 leads to a control valve 16, and continues in downward direction as indicated at 17 through an opening in the trough top 11a to terminate inside the trough.

Figure 2:
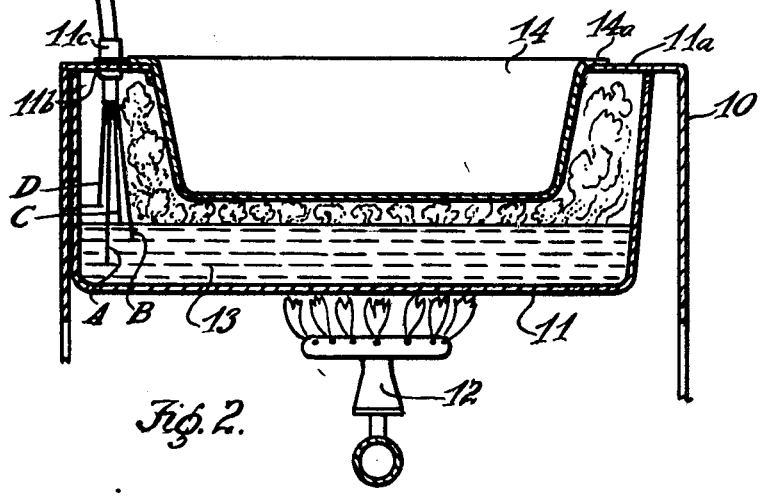
FIG. 2 is an enlarged section on the line 2—2 of FIG. 1.

The electrical unit embodying the present invention is in the form of a metal cabinet 20 which may be attached to the wall alongside or above the steam table where it will be easily seen by the attendant thereof. The cabinet receives a cable 21 in the bottom ending with a plug 22 for connecting the cabinet with a handy electric outlet. Another cable 23 extends from the side of the cabinet to the control valve 16. A conduit 24 extends from the other side of the cabinet to terminate in the trough 11 after passing through an opening 11b in the top thereof. The latter has a suitable fitting 11c to secure the terminal portion of the conduit 24 in place. The cables and conduit carry electrical wiring; and the wiring from the conduit depends with a series of electrodes of different lengths as seen in the left-hand portion of FIG. 2, the electrodes being thin rods which are coated with waterproof and electrical insulating material. The electrode ending closest to the bottom of the trough is marked A, the next higher one B, the next higher one C, and the highest D.

The electrodes are designed for response to different water levels in the trough. The electrodes B and C respond to normal or working water levels, while the electrodes A and D respond to extremes of water content. Thus, the electrode A is immersed when the water content is normal, but reacts when the level falls below the electrode, and the trough is apt to run dry. On the other hand, when the trough tends to fill above a safe level, the electrode D comes into play. Normally, this electrode is inactive; but it responds to shut off the power and turn on a red signal light when the water at the abnormal level comes in touch with the electrode D. The electrodes B and C deal with intermediate water levels to admit water at a routine low level and shut off the supply at a normal high level.

Figure 3:
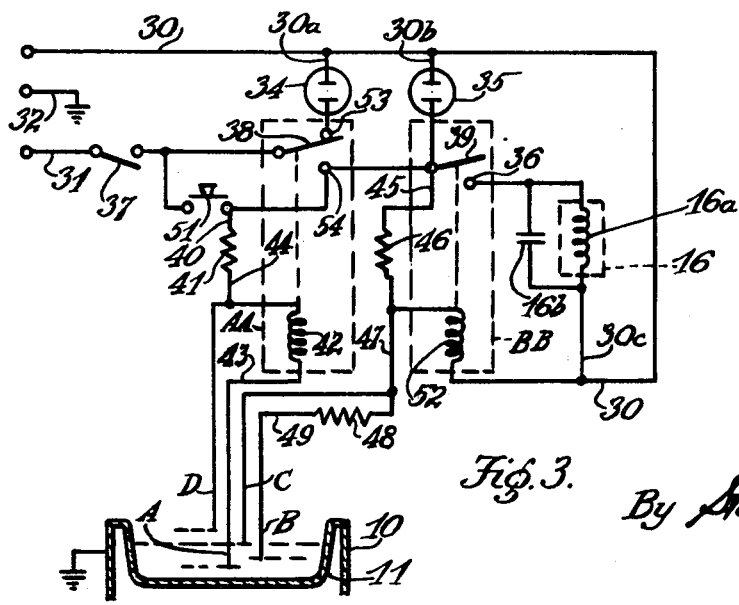
FIG. 3 is a diagrammatic view of an electric circuit involved in the invention.

The manual and automatic features of the invention operate in an electrical circuit which will now be described. The cable 21 contains main conductors 30 and 31, and an intermediate conductor 32 grounded to cabinet 20, these items being indicated at the left-hand upper part of FIG. 3. The main conductor 30 has side leads 30a and 30b to one of the terminals of a red indicator lamp 34 and an amber indicator lamp 35, these showing in the front of the cabinet 20 as seen in the left-hand top portion of FIG. 1. The water control valve 16 is indicated by dotted lines in the right-hand portion of FIG. 3, the valve being operated by a solenoid coil 16a. It is noted that a branch 30c from the conductor 30 leads to one terminal of the coil 16a. The other terminal leads to a switch terminal 36; and the terminals of the coil are bridged by an arc suppressing capacitor 16b.

The main conductor 31 receives a hand-operated switch 37 which is open before the steam table goes into operation. The conductor extends further to receive the arm 38 of a normally open relay switch and further to receive the arm 39 of a similar relay switch. The arm 38 connects with the other terminal of the red indicator lamp 34; and the arm 39 connects similarly with the amber indicator lamp 35. When arm 38 comes in contact with terminal 54 indicator lamp 35 lights. The same occurs when button switch 51 is pressed. The relay employing the switch arm 38 is indicated by dotted lines at AA, while that employing the switch arm 39 is similarly indicated at BB. The main conductor 31 is the power for the circuit, while the main conductor 30 is the neutral of return wire.

The relay AA receives a branch 40 of the conductor 31, connecting with one terminal of a current-limiting resistor 41, the other terminal thereof connecting with a relay coil 42 and terminating with a conductor 43 which connects with the electrode A. Beyond the resistor 41 a lead 44 extends to connect with the electrode D.

It is noted that the main conductor 31 extends beyond the switch arm 39 to connect with the first-mentioned terminal of the solenoid coil 16a. The said main conductor has a branch 45 extending to one terminal of a current-limiting resistor 46. The other terminal thereof extends with a lead 47 to electrode C. This lead also connects with one terminal of a ripple control resistor 48, whose other terminal continues with a lead 49 to electrode B. A finger-button switch 51 which is normally open is interposed in the branch 40. The other terminal of the resistor 46 also continues by way of the coil 52 of the relay BB to join the return conductor 30.

When the steam table is to be put into operation, it may be assumed that the trough 11 is empty, and must be filled with water to a working level before the burner 12 is turned on. Assuming that the plug 22 of the cable 21 is connected at all times with an electric service outlet, the first act of the attendant is to close the manually-operated switch 37, which turns on the red signal lamp; and the next move is to push the button 51, which causes the current to travel through the branch 40 to close relay arm 39, onward through solenoid 16a, and onward through branch 30c to the main return conductor 30. Now both signal lamps are lighted; and the solenoid 16a opens the valve 16—which is normally closed—to admit water into the trough 11. During this action the free-ending electrode A is out of the circuit. However, when the water rising in the bottom of the trough contacts the electrode A, current flows through resistor 41 and coil 42 to close switch arm 38 and turn off the red signal lamp 34. This also by-passes the button switch 51 and maintains the circuit, so that the button 51 may be released. The solenoid 16a therefore continues to keep the water valve 16 open. The amber lamp 35 will remain active, indicating that the unit is in operation.

The continued rise of water in the trough will raise the water level into touch with electrode B. This will not affect the last-described circuit because of the presence of resistor 48, so that the water will continue to rise until it touches the electrode C. This means that the normal high-water level has been reached. This development causes the by-passing and de-energizing of relay coil 52, causing switch arm 39 to open. The current to the solenoid 16a is now cut off, and the water valve 16 closes automatically, the current flowing through branch 45, resistor 46, lead 47 and electrode C, and through the water in the trough to the ground. However, if due to malfunction relay BB fails to open the switch arm 39, water will continue to rise in the trough above the proper or safe high level. This will bring the water level into touch with the electrode D, in which event the coil 42 will become by-passed and de-energized. Switch arm 38 will therefore open, cutting off the current to the solenoid and re-connecting the red indicator lamp to warn the attendant of a failure.

The normal operation of the apparatus occurs when the water level is between the electrodes C and B. When the water level falls below electrode B, the coil 52 is no longer by-passed but re-energized, closing relay switch 39. This restores the circuit of the solenoid 16a, to open the water valve 16. The trough thus fills until the water level touches electrode C. The result—a shut-off of the water—in this event has been described.

It is significant that the extreme low level electrode A is provided in addition to the routine low level electrode B. The reason is that the fall of the water level below electrode B turns on a water feed as explained before. This is normal. However, in case a defect develops in the water feed, and the level continues to fall and drops below electrode A, the switch arm 38 opens, cutting off the power circuit and allowing red signal lamp 34 to light as a warning that the water level is becoming dangerously low.

The purpose of providing resistor 46 is to limit the flow of current through relay coil 52, so that it does not allow the full voltage to reach electrode C, permitting the coil to be by-passed by water conductivity. As to resistor 41, its function is similar to that just described, that is, when water rises to electrode D it by-passes coil 42 and causes switch arm 38 to open, so that signal lamp 34 lights, as mentioned before.

The limiting resistors in the relay circuits permit the use of normally-open relay switches. The advantage of using the latter is that the switches close only when the current flows—through coil 42 or 52—preventing an open or shorted relay coil from turning on the water valve. The limiting resistors also lower voltage in the electrodes, preventing dangerous shock.

When electrodes B and C are out of the water, current flows through coil 52, causing switch arm 39 to stay closed until water touches electrode C. Should the water drop momentarily—due to ripple commotion below electrode C—enough current flows through electrode B and resistor 48 to keep switch arm 39 in the open position. Thus, having electrode B longer than electrode C will prevent ripples from turning the water off and on repeatedly. Coil 52 will not re-energize until water drops below electrode B. Using the resistor 48 in series with electrode B permits the use of only one relay with it instead of two relays to accomplish the equivalent result.

Figure 4:
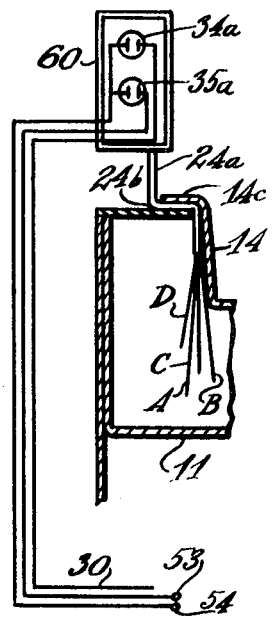
FIG. 4 is a modification of an electrode installation shown in FIG. 2.

FIG. 4 shows a modification which makes it unnecessary to mount the cabinet 20 near the steam table. The modification employs a small box 60—size exaggerated for purposes of clarity—mounted on the conduit 24a. This conduit from the box does not require the top of the steam table to be perforated, as in the main embodiment. Instead, the conduit 24a is offset at 24b into the rear of the steam table opening to project the electrodes as shown. The rim of a vessel deposited in the steam table overlies the offset, the latter being so flat that it will not raise the vessel perceptibly in the region of the box. As shown in FIG. 4, the box displays counterparts 34a and 35a of the cabinet signal lamps 34 and 35; and the box receives wiring from the conductor 30 and terminals 53 and 54 to connect the lamps into the circuit.

It is now apparent that the invention, in the main or modified forms, is a facility which relieves the attendant and any other personnel in the vicinty of the steam table from anxiety and watchfulness to keep a safe water level in the steam table. The display of the amber signal lamp is always an indication that water is present in the trough 11, and that the system is in normal operation. On the other hand, in case of a low water level, an extremely high water level, or an operational failure in the circuit, the red signal lamp immediately goes into action to warn the attendant that an abnormal situation has developed. Finally, the present circuit allows the power and the burner to remain turned on overnight without creating any emergency or undesirable effects.

We claim:

1. An automatic level control unit for liquid in a vessel, such unit employing a set of electrodes adapted for bottom contact by the liquid to establish electrical conductivity with the same, said unit including means rendering the electrodes responsive in upward order to a lowest emergency liquid level, a routine low level, a routine high level, and a highest emergency level, said unit having a circuit with a solenoid-opened liquid supply valve, and a control switch for the solenoid circuit, liquid contact with the third-lowest electrode operating the switch to break the solenoid circuit while liquid contact with the second-lowest electrode maintains the switch as stated, and freedom of the latter contact operating to close the circuit.

2. The unit of claim 1, said means comprising a primary circuit containing an emergency signal element, a starting switch in the primary circuit operating said signal element when closed, an extension circuit with a normalcy signal element, said liquid supply valve being normally closed and adapted to open by the action of a solenoid in a continuation of the extension circuit, a normally open relay switch in the latter closing the primary circuit and keeping the normalcy signal element out of action, a normally open relay switch in the continuation circuit, both switches closable by relays, and a circuit formed by the liquid contact with the lowest electrode to turn off the emergency signal element, turn on the normalcy signal element, and operate said solenoid.

3. The structure of claim 3, and a branch between the primary circuit and the extension circuit containing a normally open button switch operable to close the extension circuit momentarily.

4. The unit of claim 1, said means comprising a primary circuit containing an emergency signal element, a starting switch in the primary circuit operating said signal element when closed, an extension circuit with a normalcy signal element, said liquid supply valve being normally closed and adapted to open by the action of a solenoid in a continuation of the extension circuit, a normally open relay switch in the latter, a normally open relay switch in the continuation circuit, a relay for closing the first-named relay switch, a resistor between the latter and one terminal of the relay, and a connection from the other terminal of the relay to the lowest level electrode.

5. The unit of claim 1, said means comprising a primary circuit containing an emergency signal element, a starting switch in the primary circuit operating said signal element when closed, an extension circuit with a normalcy signal element, said liquid supply valve being normally closed and adapted to open by the action of a solenoid in a continuation of the extension circuit, a normally open relay switch in the latter, a normally open relay switch in the continuation circuit, a relay for closing the second-named relay switch, a resistor between the latter and one terminal of the relay, a connection from the other terminal thereof to the continuation circuit, and a connection from the first-named terminal of the relay to the third-lowest electrode.

6. The unit of claim 1, said means comprising a primary circuit containing an emergency signal element, a starting switch in the primary circuit operating said signal element when closed, an extension circuit with a normalcy signal element, said liquid supply valve being normally closed and adapted to open by the action of a solenoid in a continuation of the extension circuit, a normally open relay switch in the latter, a normally open relay switch in the continuation circuit, a relay for closing the second-named relay switch, a resistor between the latter and one terminal of the relay, a connection from the other terminal thereof to the continuation circuit, a connection from the first-named terminal of the relay to one terminal of a resistor, an extension from such terminal to the third-lowest electrode, and an extension from the other resistor terminal to the second-lowest electrode.

7. The unit of claim 1, said means comprising a primary circuit containing an emergency signal element, a starting switch in the primary circuit operating said signal element when closed, an extension circuit with a normalcy signal element, said liquid supply valve being normally closed and adapted to open by the action of a solenoid in a continuation of the extension circuit, a normally open relay switch in the latter, a normally open relay switch in the continuation circuit, a relay for closing the first-named relay switch, a resistor between the latter and one terminal of the relay, and a branch from such terminal to the highest-level electrode.

8. The unit of claim 1, said means comprising a primary circuit containing an emergency signal element, a starting switch in the primary circuit operating said signal element when closed, said liquid supply valve being normally closed and adapted to open by the action of a solenoid in an extension of the circuit, a normally open relay switch in the latter closing the primary circuit, a relay closing the relay switch when liquid contact is made with the lowest one of said electrodes, and a resistor interposed between the relay and the relay switch to lower the voltage in the relay and open the relay switch and extension circuit when liquid contact is made with the highest electrode.

9. The unit of claim 1, said means comprising a primary circuit containing an emergency signal element, a starting switch in the primary circuit operating said signal element when closed, said liquid supply valve being normally closed and adapted to open by the action of a solenoid in an extension of the circuit, a normally open relay switch and a relay in the solenoid circuit, and a resistor between the relay switch and the relay to lower the voltage and by-pass the relay when the third-lowest electrode receives liquid contact, whereby to allow the relay switch to open and break the solenoid circuit.

10. The unit of claim 1, said means comprising a primary circuit containing an emergency signal element, a starting switch in the primary circuit operating said signal element when closed, an extension circuit with a normalcy signal element, said liquid supply valve being normally closed and adapted to open by the action of a solenoid in a continuation of the extension circuit, a normally open relay switch in the latter closing the primary circuit and keeping the normalcy signal element out of action, and a normally open relay switch in the continuation circuit, both switches closable by relays, the emergency signal element becoming active and the extension and continuation circuits broken when the liquid level falls below the lowest electrode.

11. The unit as claimed in claim 1 including a vessel and means for supplying liquid to said vessel through said supply valve, said supply valve being subject to turbulence and ripples at times causing momentary disengagement of the liquid from said second lowest contact, said third lowest contact including a control circuit for maintaining the control switch open when the liquid momentarily disengages the second lowest contact.

12. The unit as claimed in claim 11 in which said third lowest contact is connected in series to a relay control coil through a resistor, said second lowest contact being connected in series to said control coil.

13. The unit as claimed in claim 1 including a vessel into which said electrodes depend in vertically staggered relation defining the liquid levels set forth, and means retaining said electrodes in a cluster on said vessel.

14. The unit as claimed in claim 13 in which said last mentioned means comprises a separate unit including a primary circuit portion including an emergency signal element and an extension circuit portion including a normalcy circuit element, said separate unit including means removably mounting the unit on said vessel for ready manual removal therefrom.

References Cited

UNITED STATES PATENTS

| 1,683,362 | 9/1928 | Loffler | 137—392X |
| 2,839,742 | 6/1958 | Sumner | 137—392X |
| 3,090,525 | 5/1963 | Hinds et al. | 222—64 |
| 3,091,252 | 5/1963 | Jones | 137—392 |

M. CARY NELSON, Primary Examiner

D. R. MATTHEWS, Assistant Examiner

U.S. Cl. X.R.

137—412